United States Patent
Hwang et al.

(10) Patent No.: US 10,157,607 B2
(45) Date of Patent: Dec. 18, 2018

(54) REAL TIME SPEECH OUTPUT SPEED ADJUSTMENT

(71) Applicant: International Business Machines Corporation, Armonk, NY (US)

(72) Inventors: Inseok Hwang, Austin, TX (US); Su Liu, Austin, TX (US); Eric J. Rozner, Austin, TX (US); Chin Ngai Sze, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 34 days.

(21) Appl. No.: 15/299,262

(22) Filed: Oct. 20, 2016

(65) Prior Publication Data

US 2018/0114521 A1 Apr. 26, 2018

(51) Int. Cl.
| | | |
|---|---|---|
| *G10L 15/00* | (2013.01) | |
| *G10L 13/033* | (2013.01) | |
| *G06F 17/30* | (2006.01) | |
| *G10L 15/22* | (2006.01) | |
| *G10L 15/30* | (2013.01) | |
| *G10L 25/84* | (2013.01) | |

(52) U.S. Cl.
CPC ...... *G10L 13/033* (2013.01); *G06F 17/30778* (2013.01); *G10L 15/005* (2013.01); *G10L 15/22* (2013.01); *G10L 15/30* (2013.01); *G10L 25/84* (2013.01); *G10L 2015/223* (2013.01)

(58) Field of Classification Search
CPC .................................................... G10L 15/00
USPC ...................... 704/2, 233; 714/39
See application file for complete search history.

(56) References Cited

U.S. PATENT DOCUMENTS

| | | | | |
|---|---|---|---|---|
| 6,246,672 B1 * | 6/2001 | Lumelsky | ............... | H04L 29/06 370/310 |
| 6,847,931 B2 | 1/2005 | Addison et al. | | |
| 7,412,378 B2 | 8/2008 | Lewis et al. | | |
| 7,711,561 B2 | 5/2010 | Hogenhout et al. | | |
| 8,332,212 B2 * | 12/2012 | Wittenstein | ............. | G10L 15/26 704/211 |
| 8,635,243 B2 * | 1/2014 | Phillips | ................... | G10L 15/30 704/235 |
| 8,694,319 B2 * | 4/2014 | Bodin | ................... | G10L 13/033 704/235 |
| 8,914,290 B2 | 12/2014 | Hendrickson et al. | | |

(Continued)

FOREIGN PATENT DOCUMENTS

| | | |
|---|---|---|
| CN | 105654950 A | 6/2016 |
| EP | 2051241 A1 | 4/2009 |

(Continued)

OTHER PUBLICATIONS

Google, "Spontaneously," translation to Chinese, retrieved from https://translate.google.com/#en/zh-CN/spontaneously, 2016, 1 page.

(Continued)

*Primary Examiner* — Michael Colucci
(74) *Attorney, Agent, or Firm* — Zilka-Kotab, P.C.

(57) ABSTRACT

A computer-implemented method according to one embodiment includes identifying a request for audio data, determining one or more factors associated with the request, adjusting a speed of the audio data to create adjusted audio data, based on the one or more factors, and returning the adjusted audio data in response to the request.

19 Claims, 5 Drawing Sheets

(56) References Cited

U.S. PATENT DOCUMENTS

| | | | |
|---|---|---|---|
| 9,019,174 B2 | 4/2015 | Jerauld | |
| 9,049,259 B2 | 6/2015 | Rathod | |
| 9,129,609 B2 | 9/2015 | Takagi et al. | |
| 9,149,202 B2 | 10/2015 | Morikawa et al. | |
| 9,251,787 B1* | 2/2016 | Hart | G10L 15/22 |
| 9,678,637 B1* | 6/2017 | Brothers | G06F 3/0484 |
| 9,799,336 B2* | 10/2017 | Dzik | G10L 15/26 |
| 9,886,422 B2* | 2/2018 | Gluck | G06F 17/218 |
| 2003/0028375 A1* | 2/2003 | Kellner | G10L 15/22 704/235 |
| 2003/0163311 A1 | 8/2003 | Gong | |
| 2004/0006483 A1* | 1/2004 | Sasaki | G10L 15/22 704/277 |
| 2006/0122840 A1 | 6/2006 | Anderson et al. | |
| 2008/0141180 A1* | 6/2008 | Reed | G06F 17/30017 715/854 |
| 2009/0254345 A1 | 10/2009 | Fleizach et al. | |
| 2011/0112837 A1* | 5/2011 | Kurki-Suonio | G10L 15/22 704/235 |
| 2011/0288861 A1* | 11/2011 | Kurzweil | G09B 5/06 704/235 |
| 2012/0296654 A1 | 11/2012 | Hendrickson et al. | |
| 2013/0322665 A1* | 12/2013 | Bennett | G08G 1/096855 381/300 |
| 2014/0032973 A1* | 1/2014 | Baker | G06F 11/3072 714/39 |
| 2014/0142947 A1* | 5/2014 | King | G10L 21/043 704/270 |
| 2014/0229180 A1* | 8/2014 | Watt | G09B 19/04 704/257 |
| 2015/0088522 A1 | 3/2015 | Hendrickson et al. | |
| 2015/0186154 A1 | 7/2015 | Brown et al. | |
| 2015/0262579 A1 | 9/2015 | Li | |
| 2016/0210985 A1 | 7/2016 | Deleeuw | |

FOREIGN PATENT DOCUMENTS

| | | |
|---|---|---|
| JP | S59216242 A | 12/1984 |
| JP | 2014228691 A | 12/2014 |
| JP | 2015049311 A | 3/2015 |
| JP | 5771998 B2 | 9/2015 |
| JP | 2015172622 A | 10/2015 |

OTHER PUBLICATIONS

Watanabe, "The Adaptation of Machine Conversational Speed to Speaker Utterance Speed in Human-Machine Communication," IEEE Trans on Systems, Man, and Cybernetics, 1990, vol. 20, No. 1, pp. 502-507.

Natural Reader, "The Most Powerful Text to Speech Reader" Aug. 23, 2016, Retrieved From http://www.naturalreaders.com/index.html, pp. 1-7.

Odd Cast, "Text-To-Speech," Aug. 26, 2016, Retrieved From http://www.oddcast.com/home/demos/tts/tts_example.php, pp. 1.

NIST Cloud Computing Program, Dec. 9, 2013, Retrieved From http://www.nist.gov/itl/cloud/, pp. 1-2.

Mell et al., "Definition of Cloud Computing," National Institute of Standards and Technology, Information Technology Laboratory, Version 15, 2009, pp. 2.

Mell et al., "The NIST Definition of Cloud Computing," NIST Special Publication 800-145, 2011, pp. 1-7.

* cited by examiner

REAL TIME SPEECH OUTPUT SPEED ADJUSTMENT

BACKGROUND

The present invention relates to speech output speed, and more specifically, this invention relates to dynamically adjusting a speed of output speech in real time.

Services that provide a requested audio response (e.g., online audio streaming, podcasting, Q&A services, etc.) are very popular. However, a speed at which many audio responses are provided are either static or limited to a few hard-coded options. Also, current audio responses cannot be adjusted or customized to a user.

SUMMARY

A computer-implemented method according to one embodiment includes identifying a request for audio data, determining one or more factors associated with the request, adjusting a speed of the audio data to create adjusted audio data, based on the one or more factors, and returning the adjusted audio data in response to the request.

According to another embodiment, a computer program product for real time speech output speed adjustment comprises a computer readable storage medium having program instructions embodied therewith, where the computer readable storage medium is not a transitory signal per se, and where the program instructions are executable by a processor to cause the processor to perform a method comprising identifying a request for audio data, utilizing the processor, determining one or more factors associated with the request, utilizing the processor, adjusting, utilizing the processor, a speed of the audio data to create adjusted audio data, based on the one or more factors, and returning the adjusted audio data in response to the request, utilizing the processor.

A system according to another embodiment includes a processor, and logic integrated with the processor, executable by the processor, or integrated with and executable by the processor, where the logic is configured to identify a request for audio data, determine one or more factors associated with the request, adjust a speed of the audio data to create adjusted audio data, based on the one or more factors, and return the adjusted audio data in response to the request.

Other aspects and embodiments of the present invention will become apparent from the following detailed description, which, when taken in conjunction with the drawings, illustrate by way of example the principles of the invention.

DETAILED DESCRIPTION

Figure 1:
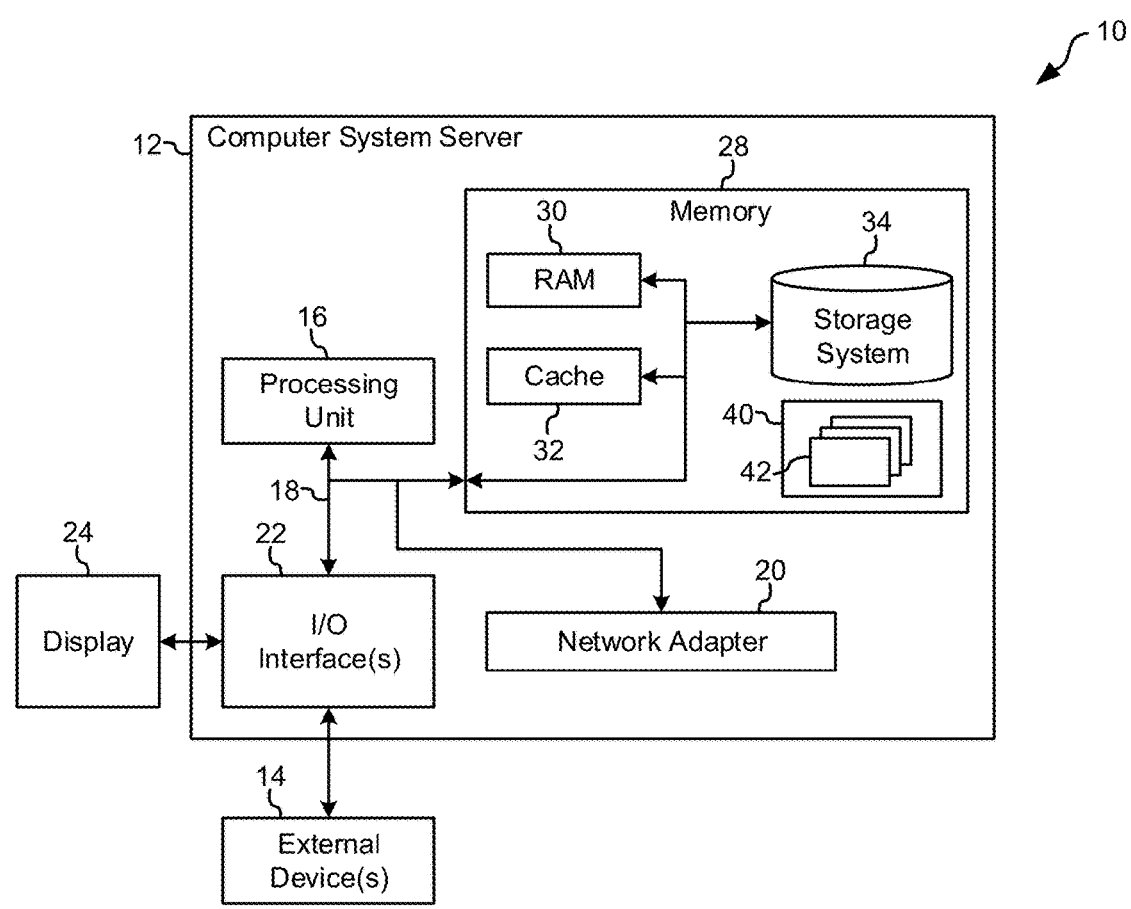
FIG. 1 depicts a cloud computing node according to an embodiment of the present invention.

The following description discloses several preferred embodiments of systems, methods and computer program products for real time speech output speed adjustment. Various embodiments provide a method for analyzing a request for speech data in addition to preset rules in order to determine a speed at which requested speech data is to be presented to a user.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "includes" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for real time speech output speed adjustment.

In one general embodiment, a computer-implemented method includes identifying a request for audio data, determining one or more factors associated with the request, adjusting a speed of the audio data to create adjusted audio data, based on the one or more factors, and returning the adjusted audio data in response to the request.

In another general embodiment, a computer program product for real time speech output speed adjustment comprises a computer readable storage medium having program instructions embodied therewith, where the computer readable storage medium is not a transitory signal per se, and where the program instructions are executable by a processor to cause the processor to perform a method comprising identifying a request for audio data, utilizing the processor, determining one or more factors associated with the request, utilizing the processor, adjusting, utilizing the processor, a speed of the audio data to create adjusted audio data, based on the one or more factors, and returning the adjusted audio data in response to the request, utilizing the processor.

In another general embodiment, a system according to another embodiment includes a processor, and logic integrated with the processor, executable by the processor, or integrated with and executable by the processor, where the logic is configured to identify a request for audio data, determine one or more factors associated with the request, adjust a speed of the audio data to create adjusted audio data, based on the one or more factors, and return the adjusted audio data in response to the request.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
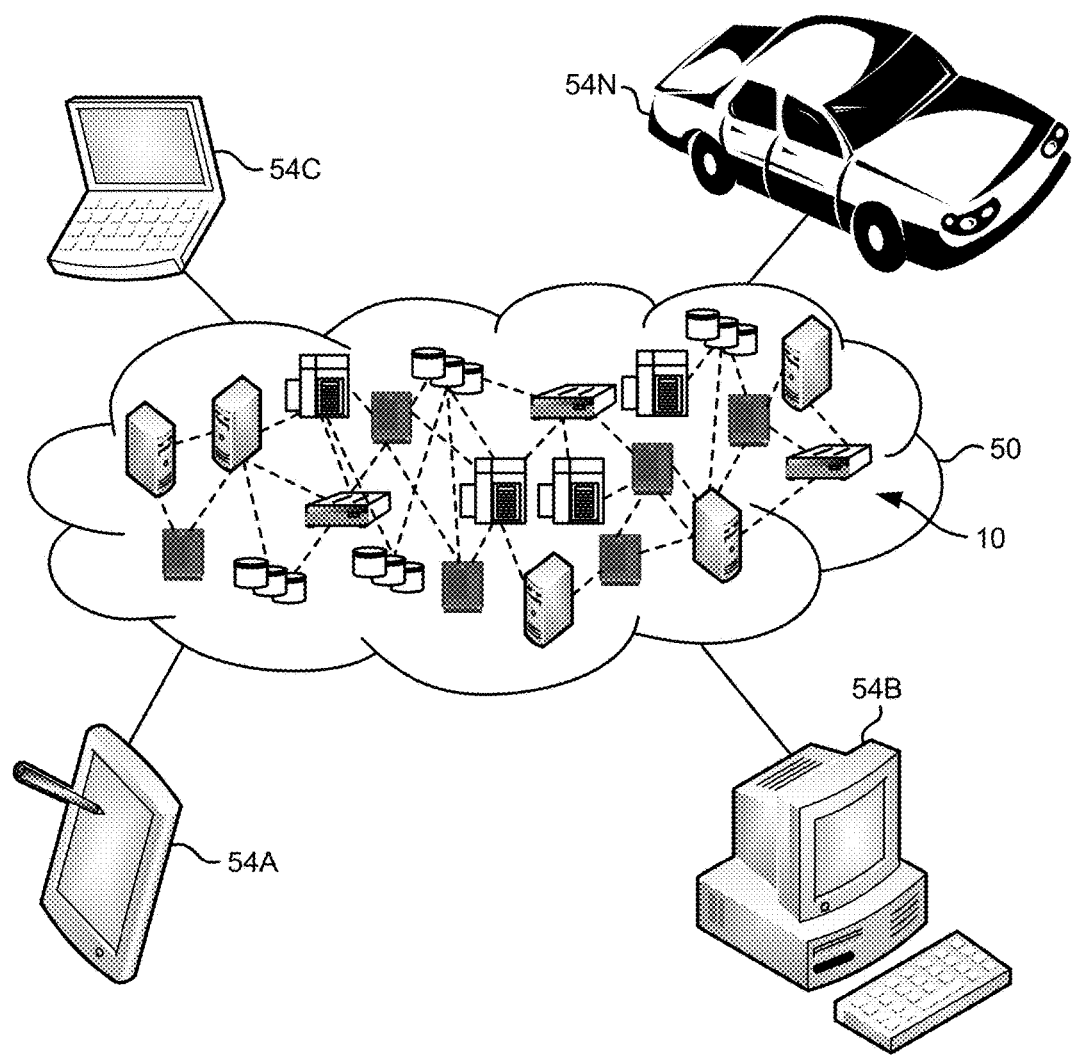
FIG. 2 depicts a cloud computing environment according to an embodiment of the present invention.

Referring now to FIG. 2, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
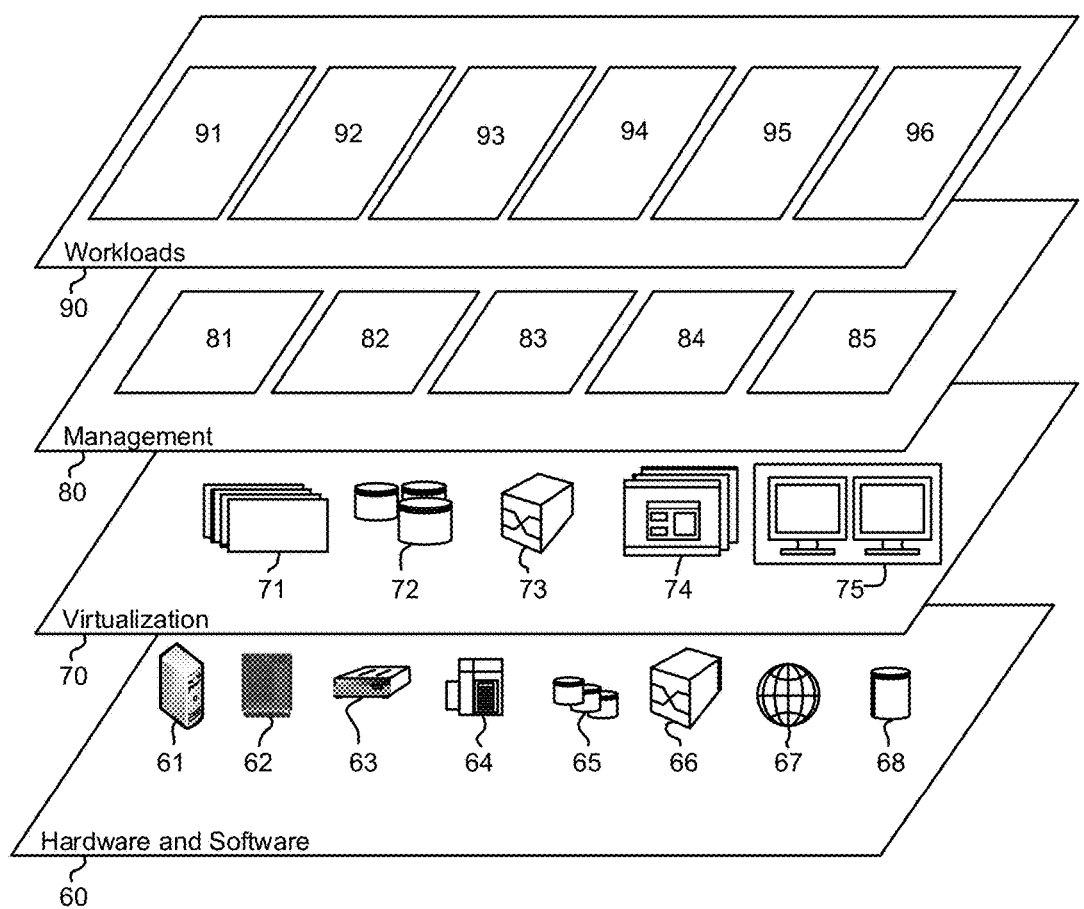
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and audio speed adjustment 96.

Figure 4:
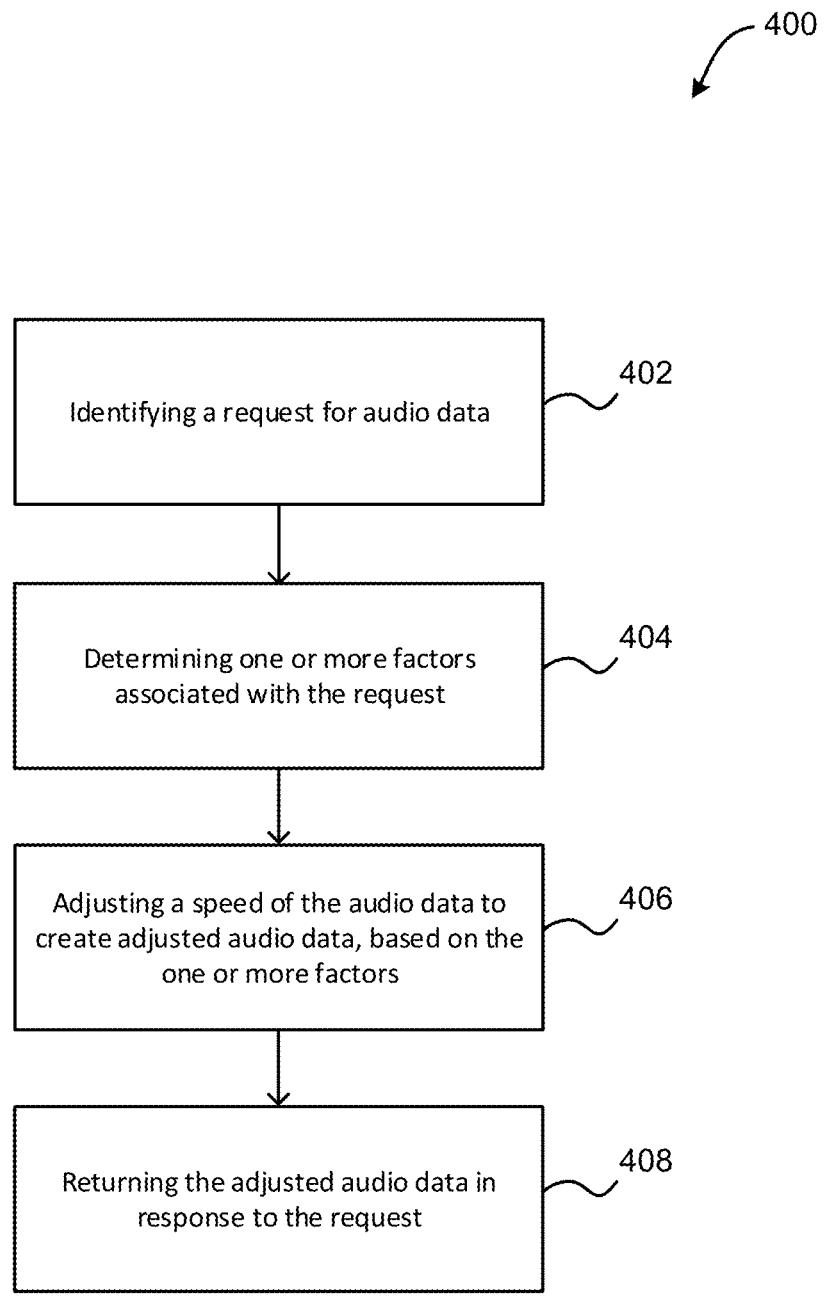
FIG. 4 illustrates a method for real time speech output speed adjustment, in accordance with one embodiment.

Now referring to FIG. 4, a flowchart of a method 400 is shown according to one embodiment. The method 400 may be performed in accordance with the present invention in any of the environments depicted in FIGS. 1-3 and 5, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by one or more servers, computers, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4, method 400 may initiate with operation 402, where a request for audio data is identified. In on embodiment, the request may include a spoken request for the audio data. For example, the request may include an audible utterance received from (e.g., spoken by) a user. In another embodiment, the request may include an interaction with a graphical user interface (GUI) by a user. For example, the request may include a selection of one or more icons within the GUI by the user, a textual input made by the user utilizing the GUI, etc.

Additionally, in one embodiment, the audio data may include a plurality of words that are presented audibly. For example, the audio data may include speech data (e.g., one or more spoken words), one or more portions of music with lyrics, etc. In another embodiment, the audio data may be pre-recorded. For example, the audio data may include a pre-recorded podcast, a pre-recorded audiobook, etc. In yet another embodiment, the audio data may be dynamically generated and/or retrieved in response to the request. For example, the audio data may include an audible response to a question (e.g., as part of a Q&A service provided by an audio-based assistant), a translation of a provided term, etc.

Further, in one embodiment, the request may be identified by a computing device such as one or more of a mobile device, a desktop computer, a server computer, etc. For example, the request may be received utilizing a microphone of a device, a GUI of a device, etc. In another embodiment, the request may be identified within a cloud computing environment.

Further still, as shown in FIG. 4, method 400 may proceed with operation 404, where one or more factors associated with the request are determined. In one embodiment, determining the one or more factors may include analyzing the request itself, where the one or more factors may include one or more environmental factors and/or speech factors present in the request. For example, the spoken request may be analyzed in order to determine one or more environmental factors (e.g., background noise, etc.). In another embodiment, the spoken request may be analyzed to determine one or more speech factors (e.g., a speed/tempo of the speech within the spoken request, an accent determined within the spoken request, etc.).

Also, in one embodiment, determining the one or more factors may include identifying one or more stored factors, where the one or more stored factors may include profile factors such as service profile factors and characteristic profile factors that are stored in a database. In another embodiment, the one or more profile factors may be predetermined. For example, the one or more profile factors may be input by a user before the request was made by the user. In another embodiment, one or more of the profile factors may be based at least in part on past requests for audio data. For example, one or more of the profile factors may include results of an analysis of past requests (e.g., past requests made by the same user that is making the current request for audio data, past requests made by different users, etc.).

In addition, in one embodiment, one or more of the factors may include service profile factors. For example, one or more of the factors may include predefined service rules (e.g., audio speed selecting rules, factor weighting rules, default audio speed settings, audio speed settings associated with predetermined native languages, applications, and languages, etc.) that are saved in a service profile. In another example, one or more of the service profile factors may be stored in association with a predefined account of one or more users.

In another embodiment, one or more of the factors may include user characteristic profile factors. For example, one or more of the factors may include user related personal characteristics and related preference settings that are stored within a user characteristic profile. For instance, the user characteristic profile factors may include one or more predetermined user preferences, such as whether a user desires a speed adjustment of audio data, whether the user desires a speed adjustment of audio data for a predetermined application, etc.

Furthermore, in one embodiment, the one or more factors may include a location of a device receiving the request. For example, a location of the device may be determined utilizing a global positioning system (GPS) module within the device. In another embodiment, the one or more factors associated with the request may be determined by a computing device such as one or more of a mobile device, a desktop computer, a server computer, etc. In yet another embodiment, the one or more factors associated with the request may be determined within a cloud computing environment.

Further still, as shown in FIG. 4, method 400 may proceed with operation 406, where a speed of the audio data is adjusted to create adjusted audio data, based on the one or more factors. In one embodiment, the speed of the audio data may be adjusted dynamically/on-the-fly in response to the request for the audio data. In another embodiment, the speed of the audio data may be adjusted by a client device. For example, the audio data may be received at a mobile device from a server device, where the received audio data has a predefined speed. The speed of the audio data may then be adjusted by the mobile device before being presented to the user. In yet another embodiment, the speed of the audio data may be adjusted by the mobile device as the audio data is being played by the mobile device.

Also, in one embodiment, the speed of the audio data may be adjusted by a server device or within a cloud computing environment. For example, the speed of the audio data may be adjusted as the audio data is created at the server device or within the cloud computing environment in response to the request for the audio data.

Additionally, in one embodiment, the speed of the audio data may be adjusted when it is determined that one or more predetermined criteria are met. For example, the speed of the audio data may be adjusted when it is determined that a user that sent the request is a non-native speaker of the language of the requested audio data, when it is determined that an existing background noise exceeds a predetermined threshold, when it is determined that a speed of the spoken request for the audio data is below a predetermined threshold, etc.

Furthermore, in one embodiment, the speed of the adjusted audio data may be selected from a plurality of different speeds. For example, the audio data may be pre-recorded at the plurality of different speeds, and one of the pre-recorded instances of audio data may be selected based on the one or more factors. In this way, the adjusted audio data may be selected from one of a plurality of pre-recorded instances based on the one or more factors associated with the request, where each of the plurality of pre-recorded instances is recorded at a different speed.

Further still, in one embodiment, the speed of the audio data may be adjusted based on a scoring of the one or more factors. For example, each of the one or more determined factors may be assigned a score, and a sum of the scores may be compared to a threshold. In another example, the score may be associated with a predetermined speed of the audio data to be used to create the adjusted audio data. In another embodiment, one or more of the determined factors may be associated with a predetermined speed of the audio data.

Also, in one embodiment, the speed of the audio data may be adjusted utilizing one or more of a plurality of techniques. For example, an interval between one or more words and/or phrases within the audio data may be adjusted, a frequency of the audio data may be adjusted, etc. Of course, however, any method of adjusting the speed of the audio data may be implemented.

In addition, as shown in FIG. 4, method 400 may proceed with operation 408, where the adjusted audio data is returned in response to the request. In one embodiment, returning the adjusted audio data may include audibly outputting the adjusted audio data. For example, the adjusted audio data may be played utilizing one or more speakers of a computing device. In another embodiment, returning the adjusted audio data may include sending the adjusted audio data from a server computer or a cloud computing environment to a client computer. For example, the adjusted audio data may be sent to a client device as a single file, may be streamed to the client device, etc.

Furthermore, in one embodiment, the adjusted audio data may include a podcast, an audiobook, a portion (e.g., a response) of a question and answer (Q&A) service provided by an audio-based assistant, a requested translation of one or more terms, a text to speech result, etc. In this way, a speed of audio data may be adjusted in real-time based on a plurality of environmental and personal factors, such that the adjusted audio data improves a listening experience of a user requesting the audio data.

Figure 5:
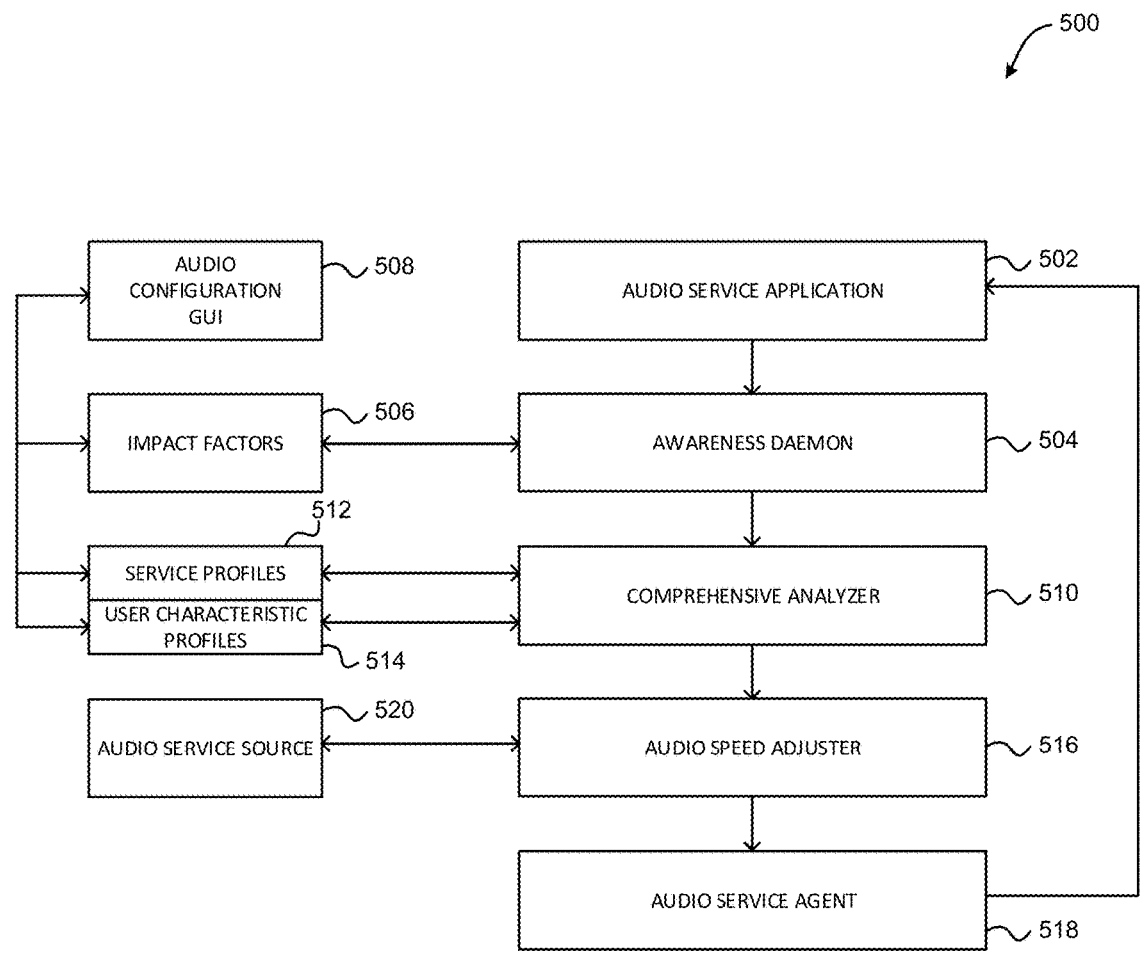
FIG. 5 illustrates an exemplary speech output adjustment environment, in accordance with one embodiment.

Now referring to FIG. 5, an exemplary speech output adjustment environment 500 is shown according to one embodiment. As shown, the speech output adjustment environment 500 includes an audio service application 502 in communication with an awareness daemon 504. In one embodiment, the audio service application 502 may include an application on a device (e.g. a mobile device, a desktop computing device, an interactive television, a wearable device, smart glasses, etc.). In another embodiment, the audio service application 502 may provide an audio service (e.g., translation, audible message reading, podcast playing, etc.).

Additionally, in one embodiment, a user of a device may request an audio service, utilizing the audio service application 502. For example, the user of the device may request a podcast (e.g., a digital audio file). In another example, the user may ask a question as part of a question and answer (Q&A) service provided by an audio-based assistant. In another embodiment, the audio service application 502 may include a graphical user interface (GUI) that the user may use to make the request.

Further, in one embodiment, the awareness daemon 504 may include a module for monitoring one or more factors that may impact a speed of audio output in response to a user request. For example, a user request for an audio service may be sent to the awareness daemon 504, where the awareness daemon 504 may then analyze the request to identify one or more details about the speaker, an environment of the speaker, etc. For instance, the awareness daemon 504 may identify one or more factors associated with the request, including background noise, a speed of speech within the request, an accent of the speaker of the request, etc.

Further still, the awareness daemon 504 is in communication with a plurality of stored impact factors 506. In one embodiment, the stored impact factors 506 may include a plurality of factors to be identified and/or considered by the awareness daemon 504 when analyzing the user request, the environment of the user, etc. For example, the stored impact factors 506 may include a location of the user, a tempo of the user's question, a content and/or topics of the input and output audio, a language of the input and output audio, an existence of background noise, etc.

In another embodiment, one or more of the stored impact factors 506 may be weighted. For example, one or more of the stored impact factors 506 that are determined to have a higher importance than other stored impact factors 506 may be assigned a higher weight than the other stored impact factors 506.

Also, the stored impact factors 506 are in communication with an audio configuration graphical user interface (GUI) 508. In one embodiment, utilizing the audio configuration GUI 508, the plurality of stored impact factors 506 may be selected and/or weighted by one or more users, one or more vendors, etc. For example, utilizing the audio configuration GUI 508, a user may explicitly choose an option that enables "setting an output speed based on a user's questioning tempo," in which case a user questioning tempo may be set as one of the stored impact factors 506. In another example, utilizing the audio configuration GUI 508, a user may explicitly choose an option that enables "setting an output speed based on sentiment, content, and location," in which case sentiment, content, and location may be set as a plurality of the stored impact factors 506.

In addition, the awareness daemon 504 is in communication with a comprehensive analyzer 510. In one embodiment, the comprehensive analyzer 510 may include an application/program that analyzes an impact of a plurality of factor changes, and gives a comprehensive impact assessment for adjusting an output speech speed. For example, the awareness daemon 504 may identify one or more details about the speaker and an environment of the speaker, and may assign a weight to one or more of the identified details, according to the stored impact factors 506. The awareness daemon 504 may then send the weighted details to the comprehensive analyzer 510 for analysis.

Furthermore, in one embodiment, the comprehensive analyzer 510 is in communication with stored service profiles 512 and stored user characteristic profiles 514, which are analyzed along with the weighted details by the comprehensive analyzer 510. In one embodiment, the stored service profiles 512 may include predefined service rules such as audio speed adjust factor selecting and weighting rules, default audio speed settings, a speed scale for certain languages, affected applications, time schedules, locations, and other audio speed related settings. In another embodiment, each of the stored service profiles 512 may be associated with a particular user and/or account, and may be saved on a client device and/or a server device.

Further still, in one embodiment, the stored user characteristic profiles 514 may include user related personal characteristics and personal preference settings. For example, one of the stored user characteristic profiles 514 may indicate that a user would like to enable or disable an audio speed adjusting feature. In another example, one of the stored user characteristic profiles 514 may indicate that a user may want to receive an audio program in a slower mode when they are receiving audio in a predetermined language and/or on a predetermined application. In yet another example, each of the stored user characteristic profiles 514 may include personal information such as an education history of a user, a native language of a user, etc.

Also, in one embodiment, the stored service profiles 512 and stored user characteristic profiles 514 are in communication with the audio configuration GUI 508. For example, the audio configuration GUI 508 may be used to input personal information into stored user characteristic profiles 514. In another example, the audio configuration GUI 508 may be used to input or change preferences into the stored service profiles 512. In another embodiment, one or more of the stored service profiles 512 and the stored user characteristic profiles 514 may be updated dynamically based on information determined for one or more users over time (e.g., during usage of the audio service application 502, etc.

Additionally, the comprehensive analyzer 510 is in communication with an audio speed adjuster 516. In one embodiment, the comprehensive analyzer 510 may determine whether a speed of a requested audio service is to be adjusted by analyzing the weighted details obtained from the awareness daemon 504, as well as the stored service profiles 512 and the stored user characteristic profiles 514. Further, in one embodiment, the comprehensive analyzer 510 may also determine a magnitude of adjustment necessary for the requested audio service. Further still, in one embodiment, the comprehensive analyzer 510 may then send a notification that the requested audio service is to be adjusted, as well as the magnitude of adjustment, to the audio speed adjuster 516.

Also, in one embodiment, the audio speed adjuster 516 may adjust a speed of the requested audio service, in response to the request received from the comprehensive analyzer 510. In one embodiment, the audio speed adjuster 516 may include a module for proactively modifying one or more parameters of an output speech speed configuration. For example, the audio speed adjuster 516 may adjust an interval between words and/or phrases within the requested audio service. In another example, the audio speed adjuster 516 may change a frequency of the requested audio service. Of course, however, the audio speed adjuster 516 may modify a speed of the requested audio service in any manner.

In addition, the audio speed adjuster 516 is in communication with an audio service source 520. In one embodiment, the audio service source 520 may include a set of serviced audio sources with associated output speed parameters. For example, these serviced audio sources may include the requested audio source that is pre-recorded at a plurality of different predetermined speeds, or may include the requested audio source that is generated and adjusted by a speech synthesis device. In this way, the audio speed adjuster 516 may retrieve or generate the requested audio service at a speed requested by the comprehensive analyzer 510.

Furthermore, the audio speed adjuster 516 is in communication with an audio service agent 518, where the audio service agent 518 is in communication with the audio service application 502. In one embodiment, the audio service agent 518 may include an application or application program interface (API) that provides customized audio assistant service. For example, the audio service agent 518 may receive the requested audio service that has had its speed adjusted, and the audio service agent 518 may then provide the adjusted audio service to the audio service application 502 (e.g., for presentation to a user, etc.).

In this way, real time speech adjustment may be performed on requested audio data, based on a real time analysis of a requester's utterance characteristics. Additionally, an adaptive speech speed mechanism may dynamically provide speech output at a desired speed. Further, a set of real time speech speed adjustment rules may be defined for service different groups of users. Further still, a cognitive insight may be provided for a proactive speech speed setting service.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
identifying a spoken request for audio data;
determining one or more speech factors associated with the spoken request;
identifying a plurality of pre-recorded instances of the audio data, where each of the pre-recorded instances has a different pre-recorded time interval between a plurality of pre-recorded words;
selecting, utilizing a processor, adjusted audio data from one of the plurality of pre-recorded instances based on the one or more speech factors associated with the spoken request; and
returning the adjusted audio data in response to the spoken request.

2. The computer-implemented method of claim 1, wherein the spoken request is received by a user.

3. The computer-implemented method of claim 1, wherein the audio data includes a podcast.

4. The computer-implemented method of claim 1, wherein the audio data includes an audible response to a question as part of a question and answer (Q&A) service.

5. The computer-implemented method of claim 1, wherein determining the one or more speech factors includes analyzing the spoken request to determine the one or more speech factors and one or more environmental factors associated with the spoken request.

6. The computer-implemented method of claim 1, further comprising identifying one or more stored factors associated with the spoken request, where the one or more stored factors include one or more service profile factors and one or more characteristic profile factors that are stored in a database.

7. The computer-implemented method of claim 1, wherein the one or more speech factors are selected from a group consisting of a background noise of the spoken request, a native language of a speaker of the spoken request, and a spoken tempo of the speaker of the spoken request.

8. The computer-implemented method of claim 1, further comprising identifying one or more stored factors associated with the spoken request, where the one or more stored factors are selected from a group consisting of an audio speed selecting rule, a factor weighting rule, a default audio speed setting, and an audio speed setting associated with a predetermined native language.

9. The computer-implemented method of claim 1, wherein the adjusted audio data is selected by a client computing device, a server computing device, or a cloud computing environment.

10. A computer program product for real time speech output speed adjustment, the computer program product comprising a non-transitory computer readable storage medium having program instructions embodied therewith, the program instructions executable by a processor to cause the processor to perform a method comprising:
    identifying a spoken request for audio data, utilizing the processor;
    determining one or more speech factors associated with the spoken request, utilizing the processor;
    identifying a plurality of pre-recorded instances of the audio data, utilizing the processor, where each of the pre-recorded instances has a different pre-recorded time interval between a plurality of pre-recorded words;
    selecting, utilizing the processor, adjusted audio data from one of the plurality of pre-recorded instances based on the one or more speech factors associated with the spoken request; and
    returning the adjusted audio data in response to the spoken request, utilizing the processor.

11. The computer program product of claim 10, wherein the spoken request is received by a user.

12. The computer program product of claim 10, wherein the audio data includes a podcast.

13. The computer program product of claim 10, wherein the audio data includes an audible response to a question as part of a question and answer (Q&A) service.

14. The computer program product of claim 10, wherein determining the one or more speech factors includes analyzing the spoken request to determine the one or more speech factors and one or more environmental factors associated with the spoken request, utilizing the processor.

15. The computer program product of claim 10, further comprising identifying one or more stored factors associated with the spoken request, utilizing the processor, where the one or more stored factors include one or more service profile factors and one or more characteristic profile factors that are stored in a database.

16. The computer program product of claim 10, wherein the one or more speech factors are selected from a group consisting of a background noise of the spoken request, a native language of a speaker of the spoken request, and a spoken tempo of the speaker of the spoken request.

17. The computer program product of claim 10, further comprising identifying one or more stored factors associated with the spoken request, utilizing the processor, where the one or more stored factors are selected from a group consisting of an audio speed selecting rule, a factor weighting rule, a default audio speed setting, and an audio speed setting associated with a predetermined native language.

18. The computer program product of claim 10, wherein the adjusted audio data is selected by a client computing device, a server computing device, or a cloud computing environment.

19. A system, comprising:
    a processor; and
    logic integrated with the processor, executable by the processor, or integrated with and executable by the processor, the logic being configured to:
    identify a spoken request for audio data;
    determine one or more speech factors associated with the spoken request;
    identify a plurality of pre-recorded instances of the audio data, where each of the pre-recorded instances has a different pre-recorded time interval between a plurality of pre-recorded words;
    select, utilizing the processor, adjusted audio data from one of the plurality of pre-recorded instances based on the one or more speech factors associated with the spoken request; and
    return the adjusted audio data in response to the spoken request.

* * * * *